(12) United States Patent
Bernhard et al.

(10) Patent No.: US 8,123,204 B2
(45) Date of Patent: Feb. 28, 2012

(54) MACHINING CENTER WITH A ROTATABLE AND PIVOTABLE WORKPIECE TABLE HAVING A CLAMPING DEVICE FOR THE ROTATION AXIS

(75) Inventors: Franz-Xaver Bernhard, Spaichingen (DE); Tobias Schwörer, Königsheim (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 442 days.

(21) Appl. No.: 12/432,732

(22) Filed: Apr. 29, 2009

(65) Prior Publication Data

US 2009/0283950 A1    Nov. 19, 2009

(30) Foreign Application Priority Data

Apr. 29, 2008    (DE) .................. 10 2008 021 416

(51) Int. Cl.
*B23Q 1/25* (2006.01)
(52) U.S. Cl. ........................... 269/59; 269/71
(58) Field of Classification Search ............ 269/55, 269/59, 61, 71, 82, 74, 77
See application file for complete search history.

(56) References Cited

U.S. PATENT DOCUMENTS

| | | | | |
|---|---|---|---|---|
| 4,369,958 | A * | 1/1983 | Maynard .................... | 269/61 |
| 6,332,604 | B1 * | 12/2001 | Chu ............................. | 269/71 |
| 6,394,892 | B2 * | 5/2002 | Hanisch et al. ............. | 451/259 |
| 6,637,737 | B1 * | 10/2003 | Beecherl et al. ............ | 269/71 |
| 6,865,788 | B2 * | 3/2005 | Pasquetto ................... | 29/38 B |
| 7,625,162 | B2 * | 12/2009 | Stein ........................... | 409/168 |
| 2003/0129035 | A1 | 7/2003 | Schworer et al. | |

FOREIGN PATENT DOCUMENTS

| | | |
|---|---|---|
| DE | 3819181 A1 | 7/1989 |
| DE | 20121653 U1 | 2/2003 |
| EP | 1262275 B1 | 9/1999 |

OTHER PUBLICATIONS

Apr. 29, 2008, Office Action from German Patent Office, in DE 10 2008 021 416.7, which is the priority German application of this U.S. application.

* cited by examiner

*Primary Examiner* — David B Thomas
(74) *Attorney, Agent, or Firm* — Kolisch Hartwell P.C.

(57) ABSTRACT

A machining center that includes a swivel bridge supported by a bearing wall and pivotable about a horizontal axis, at least one drive sprocket attached to a disc-type connector of the swivel bridge, and at least one drive system attached adjacent the bearing wall and operatively connected to the drive sprocket of the swivel bridge. The machining center is characterized by clamping of the swivel bridge being performed by a friction-locked clamping system which is arranged rotationally fixed about a bearing pin of the swivel bridge in a circular ring shape and which is operatively connected to the disc-type connector. A clamping force of the friction-locked clamping system is generated by an energy storage.

20 Claims, 5 Drawing Sheets

MACHINING CENTER WITH A ROTATABLE AND PIVOTABLE WORKPIECE TABLE HAVING A CLAMPING DEVICE FOR THE ROTATION AXIS

CROSS-REFERENCE TO RELATED APPLICATION

This application claims priority to German Patent Application No. 10 2008 021 416.7, filed Apr. 29, 2008, which is hereby incorporated by reference.

BACKGROUND AND SUMMARY

The invention relates to a machining center for drilling, milling, lathing or grinding, comprising a swivel bridge supported between two bearing walls to be pivoted about a horizontal axis, at least one drive sprocket attached to a disc-type connector of the swivel bridge, at least one drive system attached outside to the bearing wall and operatively connected to the drive sprocket of the swivel bridge.

Modern machining centers for the cutting processing of workpieces by drilling, milling, lathing or grinding are increasingly provided with rotatable and pivotable workpiece tables. When using such a machining center, the workpiece may be brought into nearly any possible position by rotating and pivoting the workpiece table, without the need for releasing the initial clamping of the workpiece on the workpiece table. Therewith, nearly any possible solid angle at the workpiece may be processed in one workpiece clamping e.g. by drilling or milling.

In general, the rotatable workpiece table is arranged on a so-called swivel bridge for receiving the workpiece to be machined. The swivel bridge is usually supported on both sides and may generally be pivoted about a horizontal axis. However, also constructions in which the swivel bridge is supported only on one side are familiar.

When starting a machining cycle, the swivel bridge is pivoted into a predetermined angular position and then securely fixed in this position by a retaining mechanism. Only then the corresponding drilling or milling processing is performed at the workpiece. During the machining by drilling or milling, partially very large processing forces or moments may occur. Said processing forces or moments must be received securely by the retaining mechanism of the swivel bridge. Otherwise, the swivel bridge would be pushed away from the predetermined position due to the processing forces or moments. In addition, the retaining mechanism of the swivel bridge also have to provide a fail safe functionality. It has to be guaranteed that the retaining mechanism will also work in case of an energy breakdown, such that an unregulated pivoting or coast down of the swivel bridge due to gravity is excluded.

In EP 1 262 275 B1, a generic rotatable and pivotable workpiece table including a swivel bridge is described. The swivel bridge disclosed in EP 1 262 275 B1 is supported on both sides and can be pivoted about a horizontally aligned pivot axis. The swivel bridge is driven directly through its drive sprocket by a drive motor arranged outside at the bearing wall, such that there results a short force flow and no torsional load on the bearing pins. Retaining mechanism for the swivel bridge having a fail safe functionality are not disclosed explicitly in EP 1 262 275 B1. However, it is state of the art that the drive motor of a drive assembly as disclosed in EP 1 262 275 B1 is generally provided with an integrated motor clamping. Said integrated motor clamping operates on the basis of the permanent magnet principle, i.e. it is clamped in the electroless state. The ventilation of the clamping is performed electro-magnetically. When switching off the machining center (main switch OFF and machining center galvanically separated from the energy supply) or in case of an unexpected energy breakdown, the clamping hub is attracted by the magnet and therewith the motor shaft of the drive motor is retained. The motor clamping is also configured for a specific number of emergency brakings, i.e. for brakings during motion in case of emergency OFF or energy breakdown. A fail safe functionality of the retaining mechanism for the swivel bridge is therefore secured.

However, the motor clamping is not adapted and suited to retain the swivel bridge during the processing step in an angularly exact processing position. For this purpose, the swivel bridge of the present case has to be retained in its processing position by the position control of the drive motor. This quasi-electronic clamping guarantees the angularly exact processing position of the swivel bridge. In the present case, the retaining mechanism of the swivel bridge consists of two members: a mechanical motor clamping for the fail safe functionality in case of an energy breakdown or emergency OFF (emergency clamping or emergency braking) and an "electronic" clamping for the angularly exact positioning of the swivel bridge during the processing step (operation clamping).

The retaining mechanism for the swivel bridge disclosed in EP 1 262 275 B1 has the following disadvantages:

In order to maintain the operation clamping for the swivel bridge, the "electronic clamping" and thus the drive control of the related rotary axis must be activated partially for hours. This results in a considerable consumption of electric current.

Based on this state of the art, it is an object underlying the present invention to enhance the known machining center in that the operation clamping of the swivel bridge can be realized without the drive control and that the operation clamping is substantially free of clearance and can receive also largest processing moments securely and exactly, while maintaining the advantages thereof.

According to the invention, the object is solved by the following features:

A machining center for drilling, milling or lathing or grinding including a swivel bridge supported between two bearing walls to be pivoted about a horizontal axis, at least one drive sprocket attached to a disc-type connector of the swivel bridge, at least one drive system attached outside at the bearing wall and operatively connected to the drive sprocket of the swivel bridge, wherein the operation clamping of the swivel bridge is performed by a friction-locked clamping system which is arranged rotationally fixed about the bearing pin of the swivel bridge in a circular ring shape and is operatively connected to the disc-type connector, and that the clamping force of the friction-locked clamping system is generated by an energy storage.

Since the clamping force for the operation clamping is generated by an energy storage according to the invention, the drive control of the swivel bridge is not required for the operation clamping.

Since the friction-locked clamping system is further provided externally about the bearing pin, the largest possible diameter can be chosen for the clamping system. Therewith, the clamping system has a lever arm as large as possible and thus the largest possible clamping force.

Since the clamping system is directly operatively connected to the disc-type connector of the swivel bridge, a short flow of force results when clamping the swivel bridge. This is very advantageous for the static and dynamic rigidity of the operation clamping.

Preferred further developments and embodiments result from the sub-claims.

According to a preferred further development, the energy storage for generating the clamping force for the operation clamping consists of a mechanical spring energy store. A mechanical spring energy store can be realized particularly simply and is also inexpensive, since mechanical spring energy stores as a common machine member are available in any design. In addition, a mechanical spring energy store also does not need a large control effort to generate the clamping force.

As an alternative, the energy storage for generating the clamping force for the operation clamping may also consist of a hydraulic or pneumatic pressure accumulator.

Preferably, the mechanical spring energy store consists of a plurality of annularly arranged springs or of an annularly arranged, disc-shaped diaphragm which can be radially elastically deformed. Due to such a design, a large-scale clamping can be generated, which in turn results in a large clamping force.

According to a preferred embodiment, the friction-locked clamping system is provided with a pressure piece which is loaded by the spring energy store toward the drive sprocket. Such a pressure piece can transmit a large clamping force to the drive sprocket and therewith guarantees a secure clamping.

According to a preferred embodiment, the friction-locked clamping system for the operation clamping comprises a fail safe functionality such that, in case of an energy breakdown, the clamping occurs inevitably by the energy storage. Due to this construction, a fail safe functionality is integrated into the friction-locked clamping system, without the need for any additional mechanical mechanism. The clamping system thus has a double function: it clamps the swivel bridge in the desired position on the one hand, and on the other hand works as a fail safe device.

In order to guarantee a symmetric force transmission of the clamping force into the swivel bridge, it is preferred to arrange the friction-locked clamping system for the operation clamping on both sides at bearing walls of the swivel bridge.

According to a preferred embodiment, the friction-locked clamping system for the operation clamping is further formed as a radial clamping system shaped as a circular ring.

Therein, the clamping preferably occurs radially to the outside or inside, such that the pressure piece is pressed to the outside or inside during clamping.

Preferably, the circular ring shaped radial clamping system acts on the drive sprocket of the swivel bridge. Therein, the circular ring shaped radial clamping system preferably clamps outwardly toward the drive sprocket of the swivel bridge.

As an alternative, the circular ring shaped radial clamping system may also act on the disc-type connector of the swivel bridge.

In this case, the circular ring shaped radial clamping system preferably clamps inwardly toward the disc-type connector of the swivel bridge.

According to a preferred further development, the swivel bridge of the inventive machining center includes two independently effective clamping systems with fail safe functionality, i.e. a first clamping system formed by a motor clamping with fail safe functionality at the drive motor of the swivel bridge and a second clamping system formed by the clamping system with fail safe functionality at the bearing pins of the swivel bridge.

Further details, features and advantages of the invention result from the following description based on the drawings, in which:

DETAILED DESCRIPTION

Figure 1:
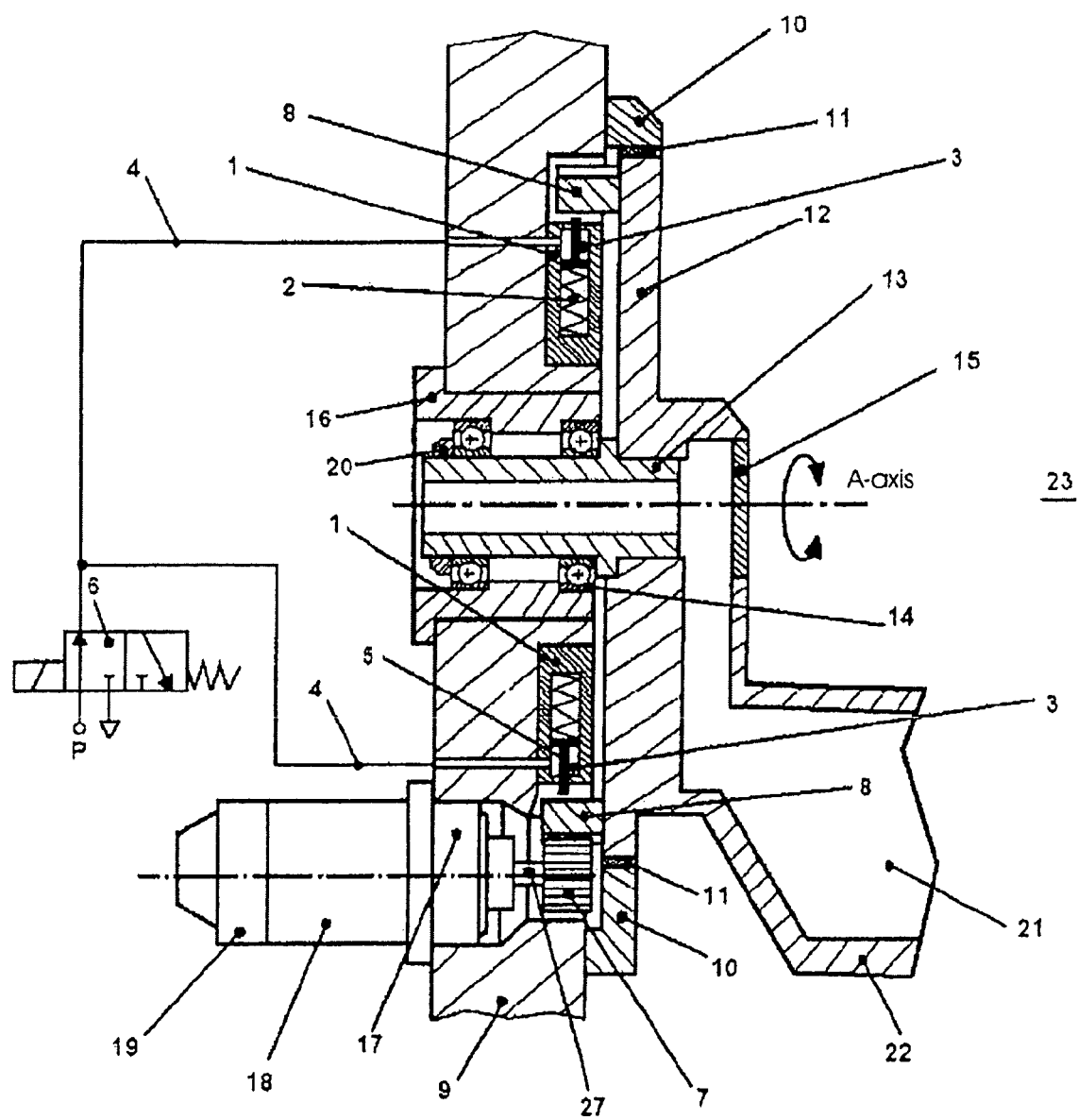
FIG. 1 shows a detailed view of a first embodiment of an inventive machining center including a released clamping system.

In FIG. 1, a first embodiment of a portion of an inventive machining center which is of interest here is shown.

Figure 2:
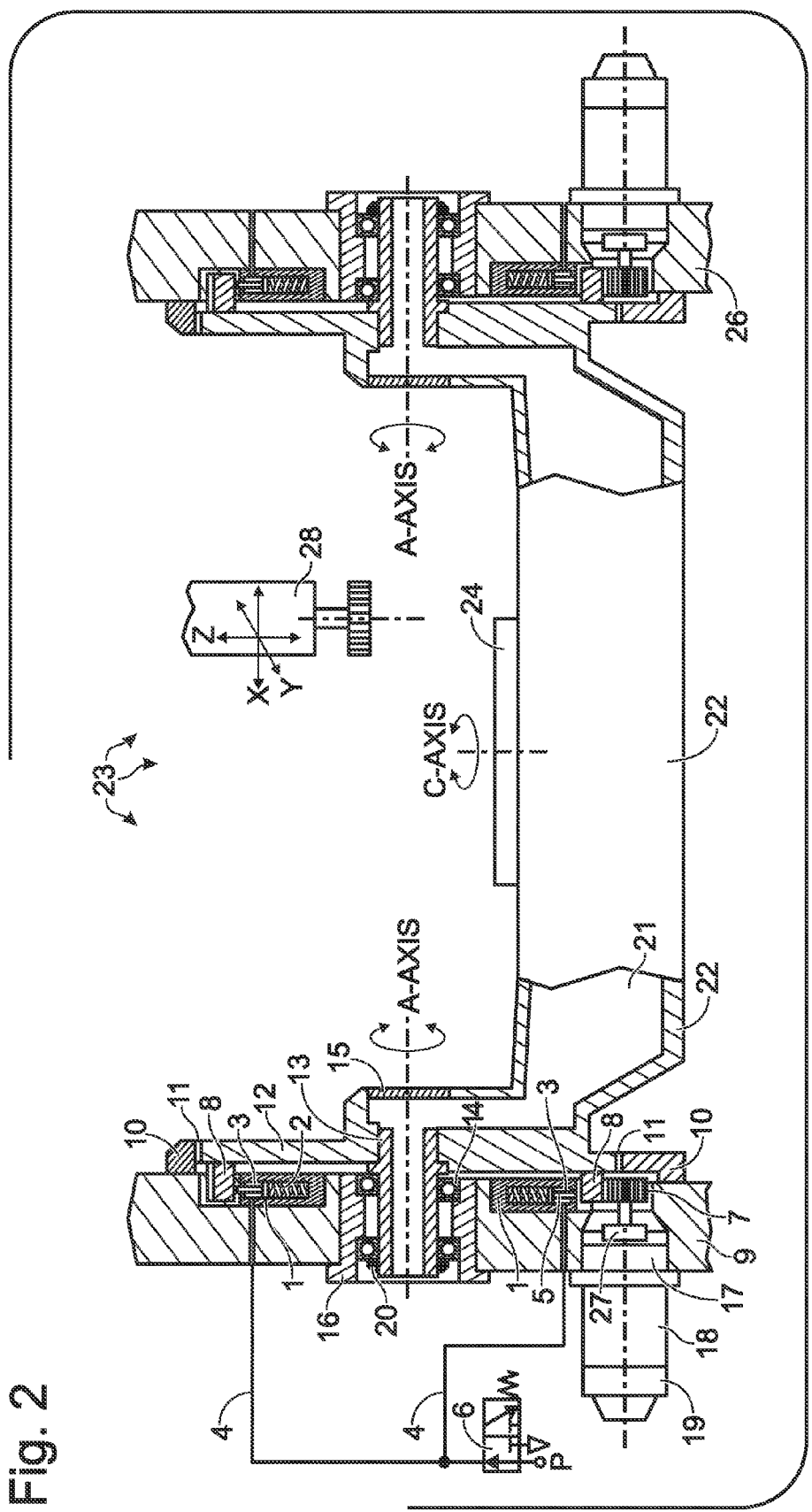
FIG. 2 shows a detailed view of a second embodiment of the inventive machining center including a released clamping system.

The left portion of a swivel bridge 22 is discernible, which supports a rotatable workpiece table 24 (see FIG. 2). On the workpiece table 24, a workpiece can be clamped, which then protrudes into the working range 23 of the machining center located above the swivel bridge and can be processed by a tool spindle 28 which is movable in the x, y and z directions (see FIG. 2).

The swivel bridge 22 has a cavity 21 serving to receive energy and signal lines and possibly driving members, e.g. tooth belts, for driving the rotatable workpiece table 24.

The swivel bridge 22 has a circular connector 12 at one end thereof, in the center of which a bearing pin 13 is disposed. In the present case, the bearing pin 13 is hollow and supported in a ball bearing 14 seated on a bearing sleeve 16 which is in turn supported in a bearing wall 9 of the machining center (which is not shown).

At the free end of the bearing pin 13, a shaft nut 20 is screwed, which guarantees a secure support of the swivel bridge 22.

In order to enable access to the bearing pin 13, for example for maintenance and/or repair purposes, the bearing pin 13 is accessible through a cover 15 disposed in the swivel bridge 22.

At the outside, the connector 12 is surrounded by a sealing ring 10. Further, a sliding seal or labyrinth seal 11 is provided between the connector 12 and the sealing ring 10.

In the vicinity of the outer periphery of the connector 12, a drive sprocket 8 is disposed, which protrudes from the connector 12 toward the bearing pin 13. The drive sprocket 8 is provided with an external toothing which meshes with a pinion 7 which is provided with a drive motor 18 through a motor shaft 27 and an ancillary transmission 17. The drive motor 18 is provided with a motor clamping 19 (motor brake) and a drive control 25 (see FIG. 5).

By using the drive motor 18, the swivel bridge 22 can be pivoted about the axis A. In addition, the integrated motor clamping 19 (motor brake) enables an emergency braking as well as a fail safe functionality. The integrated motor clamping 19 operates on the basis of the permanent magnet principle, i.e. it is clamped in the electroless state. The ventilation of the motor clamping 19 is performed electro-magnetically. When switching off the machining center (main switch OFF and machining center galvanically separated from the energy supply) or in case of an unexpected energy breakdown, the clamping hub is attracted by the magnet body and therewith the motor shaft of the drive motor 18 is retained.

In the bearing wall 9, a circular ring shaped clamping system 1 is arranged about the bearing pin 13, which serves to clamp the drive sprocket 8 and therewith the swivel bridge 22.

The clamping system 1 includes a plurality of radially aligned pressure pieces 5. Each pressure piece 5 is pressed outwardly toward the drive sprocket 8 by an energy storage 2 which is preferably formed as a spring. On the side of the pressure piece 2 facing away from the energy storage 2, a pressure chamber 3 is provided, into which a fluid line 4 ends. The fluid line 4 is connected to an electro-magnetically operable control valve 6.

While FIG. 1 shows a one-sided support of the swivel bridge 22 in the bearing wall 9, FIG. 2 shows an embodiment in which the swivel bridge 22 is supported in a left bearing wall 9 and a right bearing wall 26, and is thus supported on both sides. The support of the swivel bridge 22 in the right bearing wall 26 is identical to that in the left bearing wall 9, such that reference is made to the explanations concerning FIG. 1.

Figure 3:
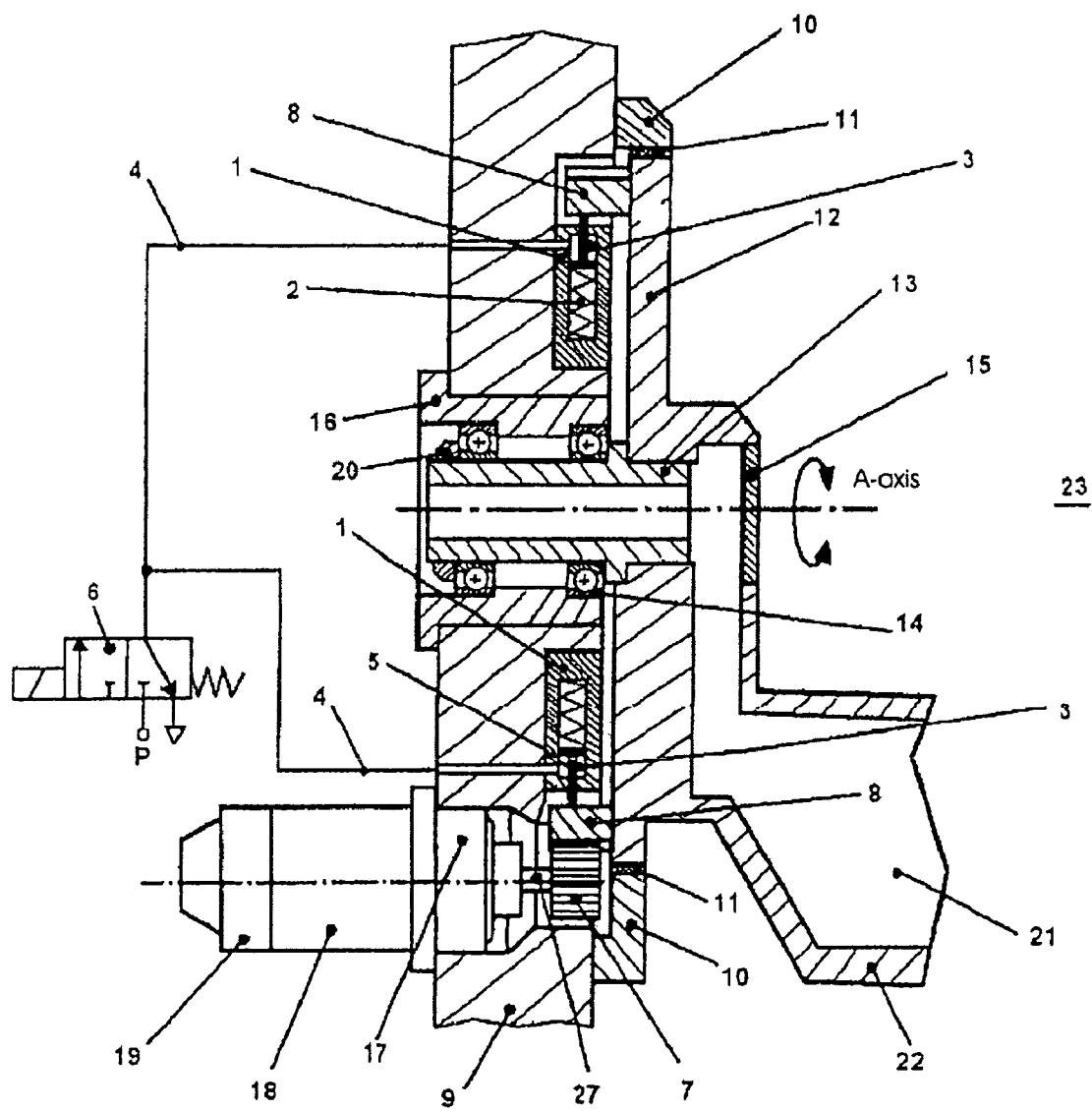
FIG. 3 shows a detailed view, analogous to FIG. 1, with a tightened clamping system.

FIGS. 1 and 2 show a state in which the clamping system 1 is not active, i.e. no clamping of the swivel bridge 22 occurs. FIG. 3 shows a state in which the clamping system 1 is active, i.e. a clamping of the swivel bridge 22 is performed.

In the positions shown in FIGS. 1 and 2, in which the pressure chambers 3 are pressurized with fluid, the control valve 6 is positioned such that the pressure pieces 5 and therewith also the energy storage 2 are pushed radially inwardly, in order to pivot the swivel bridge 22. In this state, the pressure pieces 5 do not act on the drive sprocket 8, such that the connector 12 and therewith the swivel bridge 22 can be pivoted by the drive motor 18.

In order to clamp the swivel bridge 22, the control valve is electro-magnetically displaced from the position shown in FIGS. 1 and 2 to the position shown in FIG. 3. In this position, the pressure chambers 3 are not pressurized with fluid, such that the pressure pieces 5 are pushed radially outwardly by the energy storage 2. In this state, the pressure pieces 5 act on the drive sprocket 8, such that the connector 12 and therewith the pivot bridge 22 are clamped.

In addition, the clamping system 1 features a fail safe functionality. In the conducting state, the electro-magnetically operable control valve 6 is in the position shown in FIGS. 1 and 2. In this position, the pressure chamber 3 is pressurized with fluid and the pressure piece 5 is pushed radially inwardly against the force of the energy storage 2, such that it cannot be operatively connected to the drive sprocket 8 and clamp it.

In case of an unexpected energy breakdown, the electro-magnetically operable control valve 6 is no longer supplied with current and then assumes the position shown in FIG. 3—e.g. due to a spring load—in which the pressure chamber 3 is no longer pressurized with fluid. Since the pressure chamber 3 is now depressurised, the energy storage 2 pushes the pressure piece 5 radially inwardly, such that it acts on the drive sprocket 8 and clamps it.

Figure 4:
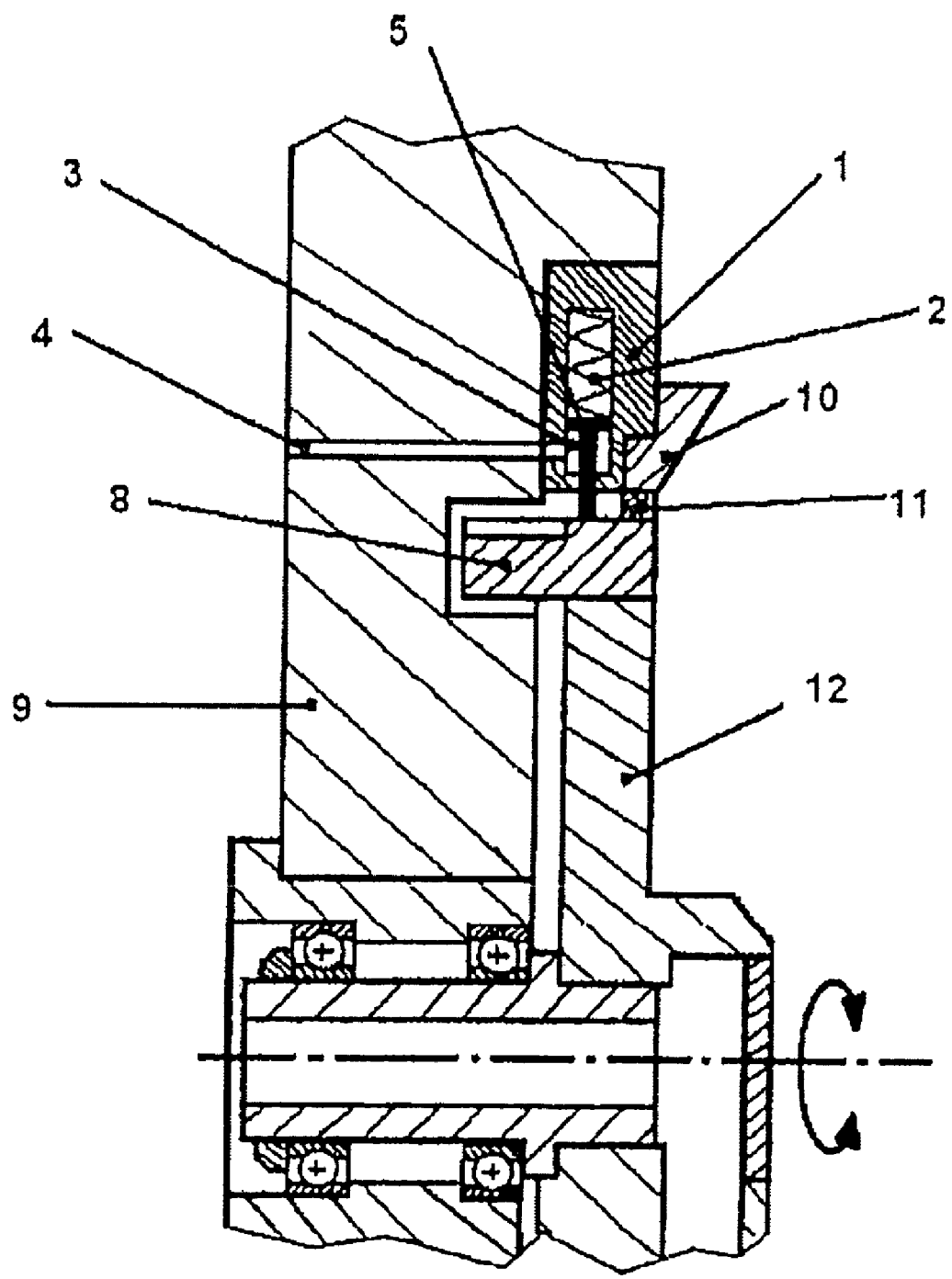
FIG. 4 shows a detailed view of a third embodiment of the inventive machining center including a tightened clamping system.

FIG. 4 shows a further embodiment in which the clamping system 1 does not act on the drive sprocket 8 from the inside, as is shown in FIGS. 1 to 3, but from the outside. Apart from that, the structure and the function are identical to those explained in connection with FIGS. 1 to 3.

Figure 5:
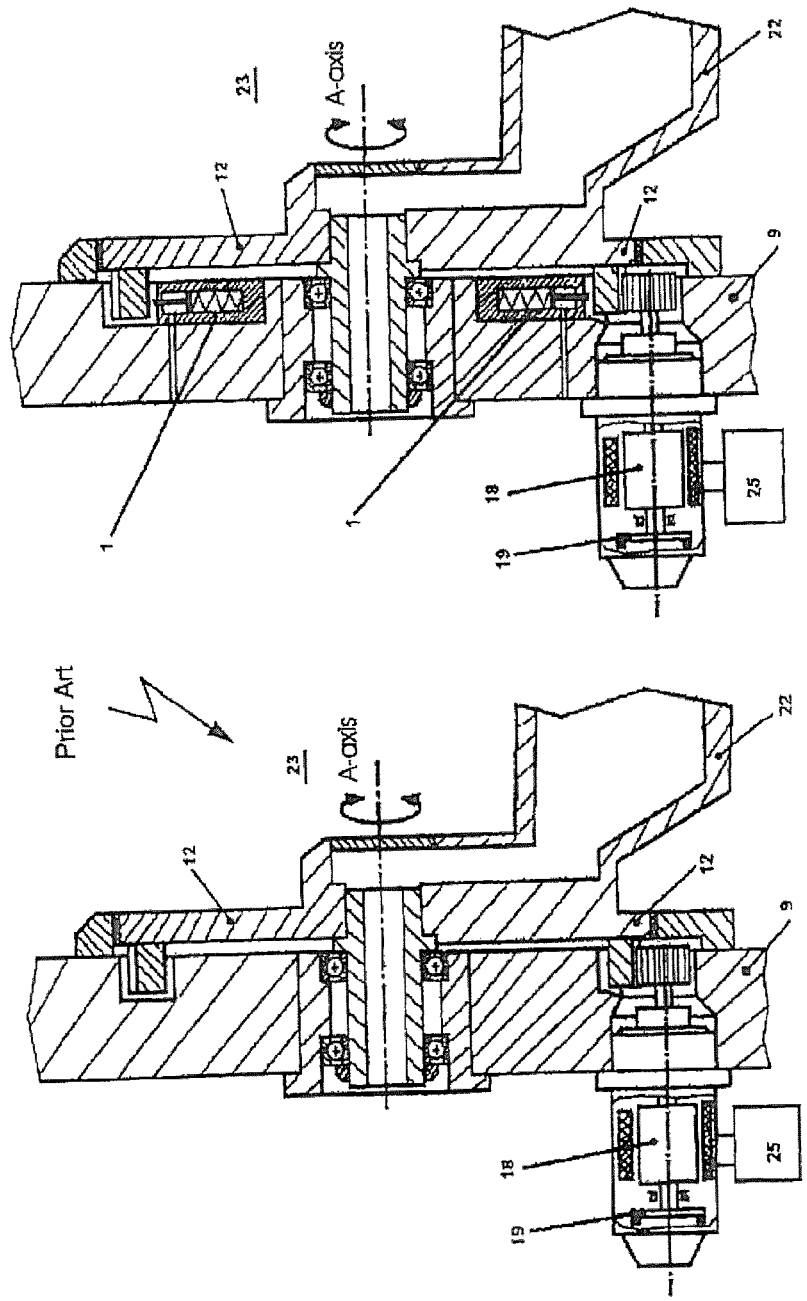
FIG. 5 shows a comparison between the inventive machining center and a machining center according to the state of the art.

FIG. 5 shows a comparison between a machining center according to the state of the art (left side) and one according to the invention (right side). While the clamping of the swivel bridge 22 and also the fail safe function in the state of the art are only performed by the drive motor 19 alone, the clamping of the swivel bridge 22 according to the present invention is uncoupled from the drive motor 19, such that the drive motor 19 only serves to pivot the swivel bridge 22, whereas the clamping system 1 performs the clamping. Due to this construction, also the fail safe functionality becomes redundant, since the drive motor 19 as well as the clamping system 1 may perform a clamping of the swivel bridge 22 in case of an unexpected energy breakdown.

As an alternative, the clamping force for the operation clamping may be generated by a hydraulic or pneumatic pressure accumulator instead of a mechanical spring energy store, as it is shown in the figures and described above.

Instead of the energy storage 2 shown in the figures and formed by springs, also an annularly arranged, radially elastically deformable diaphragm in disc shape can be used.

Further, the clamping system 1 may also act on the connector 12 of the swivel bridge 22 instead of the drive sprocket 8. In such a case, the pressure piece 5 would be axially displaceable, not radially.

The above description according the present invention only serves for illustration purposes and is not intended to restrict the invention. Within the scope of the invention, a plurality of amendments and modifications is possible without leaving the scope of the invention and its equivalents.

We claim:

1. A machining center including a swivel bridge supported by a bearing wall and pivotable about a horizontal axis, at least one drive sprocket attached to a disc-type connector of the swivel bridge, at least one drive system attached adjacent the bearing wall and operatively connected to the drive sprocket of the swivel bridge, characterized by clamping of the swivel bridge being performed by a friction-locked clamping system which is arranged rotationally fixed about a bearing pin of the swivel bridge in a circular ring shape and is operatively connected to the disc-type connector, wherein a clamping force of the friction-locked clamping system is generated by an energy storage, and wherein the friction-locked clamping system is a circular ring shaped radial clamping system.

2. The machining center of claim 1, wherein the energy storage comprises a mechanical spring energy store adapted to generate the clamping force.

3. The machining center of claim 2, wherein the mechanical spring energy store comprises a plurality of annularly arranged springs or an annularly arranged, disc-shaped diaphragm which can be radially elastically deformed.

4. The machining center of claim 2, wherein the friction-locked clamping system includes a pressure piece loadable by the mechanical spring energy store toward the drive sprocket.

5. The machining center of claim 4, further wherein clamping is performed radially outwardly such that the pressure piece is pushed outwardly during clamping.

6. The machining center of claim 4, further wherein clamping is performed inwardly such that the pressure piece is pushed inwardly during clamping.

7. The machining center of claim 1, wherein the energy storage comprises a hydraulic pressure accumulator adapted to generate the clamping force.

8. The machining center of claim 1, wherein the friction-locked clamping system includes a fail safe mechanism adapted to apply the clamping force using the energy storage.

9. The machining center of claim 1, wherein the friction-locked clamping system is arranged adjacent a side of the bearing wall of the swivel bridge.

10. The machining center of claim 1, wherein the circular ring shaped radial clamping system acts on the drive sprocket of the swivel bridge.

11. The machining center of claim 10, further wherein the circular ring shaped radial clamping system clamps outwardly onto the drive sprocket of the swivel bridge.

12. The machining center of claim 1, wherein the circular ring shaped radial clamping system acts on the disc-type connector of the swivel bridge.

13. The machining center of claim 12, further wherein the circular ring shaped radial clamping system clamps inwardly onto the disc-type connector of the swivel bridge.

14. The machining center of claim 1, further characterized by the swivel bridge including a first fail safe clamping system independent from a second fail safe clamping system, wherein the first fail safe clamping system contains a motor clamping at a drive motor of the swivel bridge and the second fail safe clamping system is formed by the friction-locked clamping system at the bearing pin of the swivel bridge.

15. A machining center including a swivel bridge supported by a bearing wall and pivotable about a horizontal axis, at least one drive sprocket attached to a disc-type connector of the swivel bridge, at least one drive system attached adjacent the bearing wall and operatively connected to the drive sprocket of the swivel bridge, characterized by clamping of the swivel bridge being performed by a friction-locked clamping system which is arranged rotationally fixed about a bearing pin of the swivel bridge in a circular ring shape and is operatively connected to the disc-type connector, wherein a clamping force of the friction-locked clamping system is generated by an energy storage that has a mechanical spring energy store adapted to generate the clamping force and the friction-locked clamping system includes a pressure piece loadable by the mechanical spring energy store toward the drive sprocket, further wherein clamping is performed radially outwardly such that the pressure piece is pushed outwardly during clamping.

16. The machining center of claim 15, wherein the friction-locked clamping system is a circular ring shaped radial clamping system.

17. A machining center including a swivel bridge supported by a bearing wall and pivotable about a horizontal axis, at least one drive sprocket attached to a disc-type connector of the swivel bridge, at least one drive system attached adjacent the bearing wall and operatively connected to the drive sprocket of the swivel bridge, characterized by clamping of the swivel bridge being performed by a friction-locked clamping system which is arranged rotationally fixed about a bearing pin of the swivel bridge in a circular ring shape and is operatively connected to the disc-type connector, wherein a clamping force of the friction-locked clamping system is generated by an energy storage, and further characterized by the swivel bridge including a first fail safe clamping system independent from a second fail safe clamping system, wherein the first fail safe clamping system contains a motor clamping at a drive motor of the swivel bridge and the second fail safe clamping system is formed by the friction-locked clamping system at the bearing pin of the swivel bridge.

18. The machining center of claim 17, wherein the friction-locked clamping system is a circular ring shaped radial clamping system.

19. The machining center of claim 17, further wherein clamping is performed inwardly such that a pressure piece of the friction-locked clamping system is pushed inwardly during clamping.

20. The machining center of claim 17, further wherein clamping is performed radially outwardly such that the pressure piece of the friction-locked clamping system is pushed outwardly during clamping.

* * * * *